United States Patent [19]

Nishino et al.

[11] Patent Number: 5,410,106
[45] Date of Patent: Apr. 25, 1995

[54] ELECTRIC FEED CABLE FOR OIL WELL PUMP

[75] Inventors: Hideharu Nishino; Hideo Sunazuka; Mitsutaka Tanida, all of Tokyo; Katsuo Haruyama, Numazu; Touru Oogawara, Tokyo, all of Japan

[73] Assignee: Fujikura Ltd., Tokyo, Japan

[21] Appl. No.: 960,424

[22] PCT Filed: Apr. 26, 1991

[86] PCT No.: PCT/JP91/00573
§ 371 Date: Dec. 23, 1992
§ 102(e) Date: Dec. 23, 1992

[87] PCT Pub. No.: WO92/20074
PCT Pub. Date: Nov. 12, 1992

[51] Int. Cl.6 .............................................. H01B 7/22
[52] U.S. Cl. ...................... 174/105 R; 174/102 R; 174/109; 174/121 A; 174/122 G
[58] Field of Search ............... 174/102 R, 109, 121 A, 174/121 R, 122 G, 105 R

[56] References Cited

U.S. PATENT DOCUMENTS

| | | | |
|---|---|---|---|
| 3,265,808 | 8/1966 | Binch | 174/105 R |
| 3,299,202 | 1/1967 | Brown . | |
| 3,413,408 | 11/1968 | Robinson | 174/121 R |
| 3,509,269 | 4/1970 | Elliott | 174/120 R |
| 3,566,009 | 2/1971 | Lamond et al. | 174/116 |
| 3,742,363 | 6/1973 | Carle | 174/102 R |
| 3,832,481 | 8/1974 | Boyd et al. | 174/102 R |
| 3,900,701 | 8/1975 | Bayles et al. | 174/102 R |
| 4,284,841 | 8/1981 | Tijunelis et al. | 174/102 R |
| 4,453,035 | 6/1984 | Neuroth | 174/103 |
| 4,515,993 | 5/1985 | MacKenzie | 174/102 R |
| 4,665,281 | 5/1987 | Kamis | 174/102 R |
| 5,086,196 | 2/1992 | Brookbank et al. | 174/106 R |

FOREIGN PATENT DOCUMENTS

| | | |
|---|---|---|
| 0100829 | 2/1984 | European Pat. Off. . |
| 0106708 | 4/1984 | European Pat. Off. . |
| 0208178 | 6/1986 | European Pat. Off. . |
| 2534059 | 7/1983 | France . |
| 2583915 | 6/1985 | France . |
| 59-66004 | 4/1984 | Japan . |
| 59-181415 | 10/1984 | Japan . |
| 60-63817 | 4/1985 | Japan . |
| 61-124916 | 8/1986 | Japan . |
| 61-296605 | 12/1986 | Japan . |
| 62-37833 | 3/1987 | Japan . |
| 63-45694 | 11/1988 | Japan . |
| 2145556 | 3/1985 | United Kingdom . |

Primary Examiner—Morris H. Nimmo
Attorney, Agent, or Firm—Oblon, Spivak, McClelland, Maier & Neustadt

[57] ABSTRACT

The present invention relates to a cable used to supply electric power to a pump for pumping crude oil from an oil well. It is consisted of an insulating layer, a resin sheath and a metallic sheath sequentially layered onto the surface of a conductor. A protective layer comprised by a wrapping of thermal resistant tape is formed at the surface of at least one of the insulating layer and the resin sheath. Due to the provision of this protective layer, it is possible to prevent the breakdown of the insulating layer and the formation of holes in the cable caused by pressure changes occurring when the cable is removed from an oil well within the high pressure environment.

3 Claims, 1 Drawing Sheet

ELECTRIC FEED CABLE FOR OIL WELL PUMP

BACKGROUND OF THE INVENTION

Field of the Invention

The present invention relates to a cable (hereinafter referred to as "electric feed cable") utilized to supply electric power to a pump (hereinafter referred to as "oil well pump") for pumping crude oil from an oil well. In particular, this invention relates to a cable which possesses excellent thermal resistant and oilproof properties, as well as superior mechanical strength, while at the same time is not damaged even when repeatedly exposed to large changes in pressure.

Prior Art

Both high temperatures and high pressures are present in the environment within an oil well excavated for the purpose of pumping crude oil to the earth's surface (i.e., 160° C. at 100 kg/cm$^2$). Additionally, this environment also contains a hostile atmosphere formed from a mixture of gaseous crude oil, water vapor and such corrosive gases as hydrogen sulfide. Accordingly, a cable which is to be used in this type of environment for supplying electric power to an oil well pump must by necessity possesses thermal resistant and oilproof properties, as well as have sufficient mechanical strength and electrical insulating properties. Heretofore, there has been well known a cable used for this purpose as shown in FIG. 2, having a multi-conductor structure in which a plurality (three in FIG. 2) of conductors, around the outer surface of which an insulating layer 2 is formed, are cabled together and fill a jacket 3, the surface of the jacket 3 being further covered with a metallic armor 4.

However, while it is true that the conventional cable as described above has good mechanical strength, after repeated insertion into and withdrawal from an oil well within the high temperature-high pressure environment, it becomes impossible to avoid the breakdown of the cable caused by pressure changes. In other words, the following problems are present in the use of conventional cable as described above. When a cable is inserted into an oil well, gaseous components of the crude oil penetrate to the inside of the cable under conditions where volumetric expansion of the gaseous components is restricted. Since, in this case, through provision of jacket 3 and metal armor 4, the cable is provided sufficient protection, no damage is incurred from the gaseous component of the crude oil which has penetrated into the cable. However, when the cable is removed from the high pressure environment within the oil well, the pressure impinging on the cable drops rapidly and, due to this pressure drop, the gaseous components of the crude oil which have penetrated into the cable give rise to volumetric expansion, causing small holes to form in the cable. When such holes are formed in the cable, the breakdown in the electrical insulation of the cable progresses and eventually the electrical insulation of the cables becomes no longer sufficient. Furthermore, when a cable in which such holes have formed is again inserted into an oil well, the gaseous components of the crude oil permeate in these holes. Furthermore, when the cable is again withdrawn, the holes become even further expanded, leading to degradation of the cable.

It is therefore an object of the present invention to provide an electric feed cable for an oil well pump which, by preventing the formation of holes due to decompression upon withdrawal of the cable from an oil well, does not incur any damage, even when repeatedly inserted into and withdrawn from an oil well.

SUMMARY OF THE INVENTION

The electric feed cable for an oil well pump of the present invention is a multi-conductor cable in which a plurality of conductors, around the surface of which an insulating layer is formed, are cabled together, filling jacket 3; this multi-conductor cable possessing a protective layer formed by wrapping thermal resistant tape around the surface of at least one of either the insulating layer or the jacket.

Because of the provision of a protective layer formed by wrapping thermal resistant tape as described above, it is possible to prevent the formation of holes caused by pressure changes. It therefore becomes possible to obtain a cable which, even if repeatedly inserted into and withdrawn from a high temperature-high pressure oil well, is not damaged. Accordingly, it becomes possible to repeatedly use the cable and extend the service life thereof.

PREFERRED EMBODIMENTS OF THE PRESENT INVENTION

A more detailed explanation of the electric feed cable for an oil well pump according to the present invention will be provided below.

Figure 1:
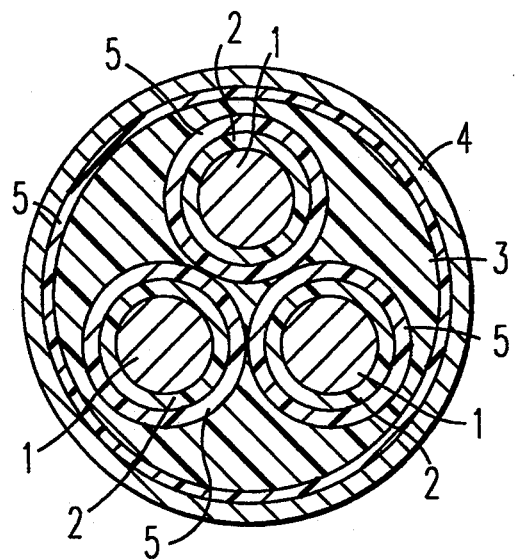
FIG. 1 is an schematic cross-sectional view showing one of the embodiments of the present invention of the electric feed able for an oil well pump.
Figure 2:
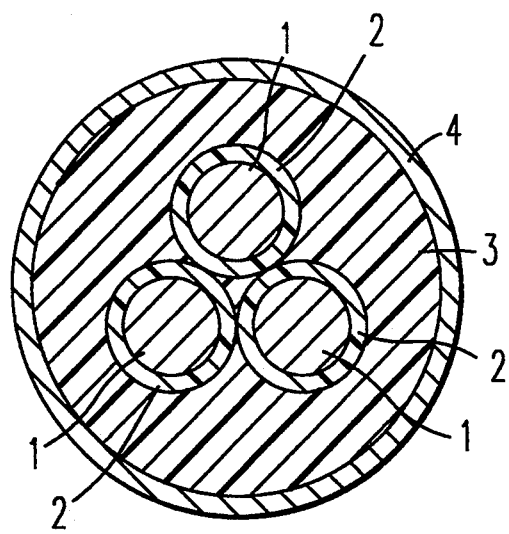
FIG. 2 is an schematic cross-sectional view showing an example of a conventional multi-conductor cable used in supplying electric power to an oil well pump.

FIG. 1 is a schematic cross-sectional view showing one of the embodiments of the electric feed cable for an oil well pump of the present invention. The cable shown in FIG. 1 is different from the conventional cable shown in FIG. 2 in the that the cable shown in FIG. 1 possesses a protective layer 5 formed by wrapping thermal resistant tape in between insulating layer 2 and jacket 3, whereas the conventional cable in FIG. 2 does not. Protective layer 5 is provided with the object of preventing the formation of holes in the cable which occur due to pressure changes arising when the cable is withdrawn from inside an oil well. That is, protective layer 5 has the following effects. Because protective layer 5 is comprised of thermal resistant tape, even if immersed in a high temperature oil well, thermal damage will not occur, and protective layer 5 acts as a thermal insulating material with respect to insulating layer 2. Therefore, protective layer 5 is effective in preventing the breakdown of the electrical insulation of insulating layer 2 due to high temperatures. Moreover, because protective layer 5 is formed by wrapping tape as described above, overlapped wrapping of the tape makes it difficult for the gaseous components of the crude oil to penetrate into the cable, and prevents the swelling of insulating layer 2. Furthermore, in protective layer 5, formed by wrapping tape as described above, a clamping stress is applied with respect to insulating layer 2 and, as a result, the formation of holes caused by a rapid pressure release is restrained by this clamping stress. Furthermore, because protective layer 5 is formed by wrapping tape as described above, no complicated method of production is required.

In order to manufacture the cable shown in FIG. 1, an insulating layer 2 is first formed around the surface of conductor 1, and thermal resistant tape which comprises protective layer 5 is wrapped around the insulating layer 2. As the material for insulating layer 2, it is most preferable to use a resin which has excellent thermal resistant and superior electrical insulating properties during exposure to high temperatures and good processability. For example, ethylene-$\alpha$-olefin-diene tertiary copolymer or ethylene-$\alpha$-olefin copolymer formed by copolymerizing $\alpha$-olefin containing 3 to 8 carbon atoms and ethylene may be preferably used.

The thermal resistant tape comprising the protective layer 5 is one which possesses thermal resistant and oilproof properties. More concretely, the thermal resistant tape is comprising an inorganic fiber cloth which is made up of woven or netted inorganic fiber such as, for example, fiberglass, carbon fiber or the like, or a composite tape which is comprising the aforementioned inorganic fiber cloth adhered to a mica tape. Alternatively, an inorganic fiber reinforced mica tape wherein a number of strands of inorganic fiber are adhered to the mica tape in parallel with respect to tile longitudinal direction of the mica tape may also be used. However, the preferable thickness of the protective layer 5 depends upon such factors as the material of the thermal resistant tape and the environment within which the cable is to be used; a range of 0.05 to 0.30 mm is preferable. Furthermore, while the pitch of the wrapping of the thermal resistant tape around the cable is not particularly limited, as the thickness of the protective layer 5 depends on the thickness of each and overlapped thermal resistant tape, the greater the thickness of protective layer 5 and the larger the number of overlapped layers, the greater the suppression of hole formation will be.

Jacket 3 is a covering material with a solid construction, prepared in order to provide mechanical strength to the cable. Preferable materials used in this case are, in addition to ethylene-$\alpha$-olefin copolymer and ethylene-$\alpha$-olefin-diene tertiary copolymer, for example, acrylic rubber, acrylonitrilebutadiene copolymer or the like. Moreover, in shaping jacket 3, it is preferable to use an extrusion method.

Metallic armor 4 is provided for the purpose of preventing damage of the cable from external stress. Preferably used for metallic armor 4 are, for example, the metallic armors referred to as "interlocked armor" disclosed in Japanese Utility Model Application Post-Examination Publication No. Sho 46-6901 and Japanese Patent Application Post-Examination Publication No. Sho 57-28444. Use of this interlocked armor is preferable as the mechanical strength of the cable may be improved without a loss of flexibility.

In the cable shown in FIG. 1, protective layer 5 is formed between insulating layer 2 and jacket 3. However, the positioning of protective layer 5 is not limited to this example, but may also be formed in between jacket 3 and metallic armor 4, or in between both insulating layer 2 and jacket 3 and jacket 3 and metallic armor 4. In particular, when protective layers 5 are provided at both surfaces of insulating layer 2 and jacket 3, the efficiency of preventing hole formation due to pressure changes is even further enhanced.

Furthermore, in the cable of the present invention, because protective layer 5 is formed by wrapping thermal resistant tape, the manufacturing process is a simple one.

EXAMPLE 1

A test cable core was formed by coating the surface of 8.4 mm diameter conductors with ethylene-$\alpha$-olefin copolymer as an insulating layer. The thickness of the insulating layer was 2.0 mm. Each type of thermal resistant tape was wrapped around the surface of the test cable core respectively, forming a protective layer. The width of each thermal resistant tape was 30 mm. The wrapping pitch along the cable was set so that with each consecutive wrapping, the thermal resistant tape was placed so as to overlap the previous wrapping by a half width. Each of thus obtained test cables 1 to 6 were soaked for 5 days in oil maintained at 100 kg/cm$^3$ and 200° C. Following this treatment, the cables were removed and checked for the presence or absence of hole formation or expansion of the insulating layer. The results are shown in Table 1. "Mica/fiberglass woven fabric" under the column entitled "Thermal resistant tape material" in Table 1 Indicates a tape in which mica adhered to the fiberglass woven fabric.

The results shown in Table 1 confirm that a tape in which mica adhered to the fiberglass woven fabric is preferable as the thermal resistant tape comprising the protective layer.

EXAMPLE 2

A test cable core of a diameter of 12.4 mm was formed by coating the surface of a conductor of diameter 8.4 mm with ethylene-$\alpha$-olefin copolymer as an insulating layer. The thickness of the insulating layer was 2.0 mm. Test cables 7 to 14 were formed by wrapping each type of thermal resistant tape around the surface of the test cable core respectively, and sealing both ends of each cable core with epoxy resin. The wrapping pitch of the thermal resistant tape along the cable core was identical to that in Example 1.

3% by weight sodium chloride aqueous solution and oil (ASTM-No. 2) were poured into a dipping vat so that each occupied ⅓ of the capacity of the dipping vat. The dipping vat thus filled with water-oil mixture liquid was placed in an autoclave maintained at 200° C. with a nitrogen atmosphere of 50 kg/cm$^2$, approximating the conditions within an actual oil well. ⅔ of the length of the aforementioned test cables were immersed in the mixture liquid and left for 3 days. Following this, the pressure in the autoclave was rapidly released and each test cable was removed and examined for the presence or absence of hole formation, as well as changes in the condition of the insulating and protective layers. These results are shown in Table 2.

The terms "Mylar," "Tedlar," and "Kapton" used in Table 2 all indicate films manufactured by the DuPont Chemical Company. Mica/fiberglass woven fabric indicates a tape in which mica is adhered to fiberglass woven fabric; glass/mica tape indicates a tape in which fiberglass is adhered to mica tape.

As is clear from Table 2, the Mylar, Nylon 6, Nylon 6,6 and Kapton melted away, and their thermal resistance are inferior to the others, while the Tedlar generated some cracking in some portions. Accordingly, from these experimental results it may be confirmed that a tape in which mica is adhered to fiberglass woven fabric, a tape in which fiberglass has been adhered to mica tape and woven glass fiber are preferable as the thermal resistant tape comprising the protective layer.

EXAMPLE 3

An ethylene-α-olefin copolymer was coated at a thickness of 2.0 mm around the surface of a 7.4 mm diameter conductor as an insulating layer. Following this, the first protective layer as shown in table 3 was wrapped around the surface of the aforementioned conductor respectively, and three such conductors were cabled together. After covering with the jacket shown in Table 3, the second protective layer was wrapped thereon, and in this manner test cables 15 to 18 were formed. The wrapping pitch of the thermal resistant tape was identical to that in Example 1. Epoxy resin was used to seal both ends of the thus prepared test cables 15 to 18 in the same fashion as in Example 2. Following this, the test cables were placed in an autoclave under the same conditions as applied in Example 2 and testing was carried out on hole formation. These results are also shown in Table 3.

The results in Table 3 confirm that through provision of two protective layers formed by wrapping of thermal resistant tape, the formation of holes in the insulating layer and jacket may be completely prevented.

TABLE 1

| Test Material | Thermal Resistant Tape Material | Presence or Absence of Protective Layer after Soaking | Presence or Absence of Hole Formation | Presence or Absence of Sheath Swelling |
| --- | --- | --- | --- | --- |
| 1 | none | — | Present | Present |
| 2 | polyethylene | Melted away | Present | Present |
| 3 | polypropylene | Melted away | Present | Present |
| 4 | polyester | Melted away | Present | Present |
| 5 | fiberglass woven fabric | No change observed | Absent | Absent |
| 6 | mica/fiberglass woven fabric | No change observed | Absent | Absent |

TABLE 2

| Test Material | Thermal Resistant Tape Material | Thermal Resistant Tape Thickness | Condition of Protective Layer After Completion of Examination |
| --- | --- | --- | --- |
| 7 | Mylar | 0.05 mm | Melted away |
| 8 | Nylon 6 | 0.03 mm | Melted away |
| 9 | Nylon 6, 6 | 0.02 mm | Melted away |
| 10 | Tedlar | 0.05 mm | Remaining but with cracking in some portions |
| 11 | Kapton | 0.03 mm | Approximately half melted |
| 12 | Mica/fiberglass woven Fabric | 0.15 mm | No change observed |
| 13 | Glass/Mica tape | 0.15 mm | No change observed |
| 14 | Grass | 0.08 mm | No change observed |

| Test Material | Presence or Absence of Hole Formation | Diameter of the Insulating Layer After Completion of Experiment |
| --- | --- | --- |
| 7 | Present | Increased 1.40 times in size |
| 8 | Present | Increased 1.39 times in size |
| 9 | Present | Increased 1.37 times in size |
| 10 | Absent | No change observed |
| 11 | Present | Increased 1.25 times in size |
| 12 | Absent | No change observed |
| 13 | Absent | No change observed |
| 14 | Absent | No change observed |

TABLE 3

| | Cable Structure | | | | |
| --- | --- | --- | --- | --- | --- |
| Test Material | Conductor | Insulating Layer | First Protective Layer | Jacket | Second Protective Layer |
| 15 | Single fiber | Ethylene-α-olefin | Mica/fiberglass woven fabric | Ethylene α-olefin | Absent |
| 16 | Single fiber | Ethylene-α-olefin | Mica/fiberglass woven fabric | Ethylene-α-olefin | Mica/fiberglass woven fabric |
| 17 | Single Fiber | Ethylene-α-olefin | Nylon woven cloth | Ethylene-α-olefin | Absent |
| 18 | Single fiber | Ethylene-α-olefin | Nylon woven cloth | Ethylene α-olefin | Mica/fiberglass woven fabric |

| Test Material | Presence or Absence of Hole Formation in jacket | Presence or Absence of Hole Formation in Insulating Layer |
| --- | --- | --- |
| 15 | Present | Absent |
| 16 | Absent | Absent |
| 17 | Present | Present |

TABLE 3-continued

| | | |
|---|---|---|
| 18 | Absent | Absent |

Possibilities of Industrial Application

As explained above, because the electric feed cable for an oil well pump of the present invention is provided with a protective layer formed by wrapping of thermal resistant tape, even if the cable is repeatedly inserted into and removed from an oil well, there is no holes formed in the insulating layer, therefore making it possible to prevent the breakdown of the insulating layer. Accordingly, it becomes possible to use the cable repeatedly and extend the life span thereof. Moreover, this electric feed cable for an oil well pump is provided with a protective layer formed by wrapping of thermal resistant tape; therefore, not only is hole formation prevented, but the electric feed cable for an oil well pump also exhibits superior thermal resistance and therefore may be utilized over a longer period of time than conventional cables.

What is claimed is:

1. An electric feed cable for an oil well pump for use in supplying electric power to a pump for extracting crude oil from an oil well comprising a multi-conductor cable and a protective layer,
    wherein said multi-conductor cable consists of a plurality of conductor strands which are covered with an insulating layer at each surface of said conductor strands and are cabled together, a jacket enclosing said cabled conductor strands and insulating layer, and a metal armor enclosing said jacket,
    and wherein said protective layer consists of a composite tape consisting of a mica tape and an inorganic fiber woven fabric adhered together, possesses thermal resistant and oilproof properties, and is formed at the surface of at least one of said insulating layer and said jacket.

2. An electric feed cable for an oil well pump according to claim 1, wherein said composite tape consists of a mica tape and a fiberglass woven fabric adhered together.

3. An electric feed cable for an oil well pump according to claim 1, wherein strands of an inorganic fiber constituting said inorganic fiber woven fabric are directed in parallel with respect to the longitudinal direction of said mica tape.

* * * * *